J. RUMELY.
Thrashing-Machine.

No. 214,056. Patented April 8, 1879.

WITNESSES:
Gorde R. Smith
H. W. Munday

INVENTOR:
John Rumely
by Munday & Evarts
his attys

UNITED STATES PATENT OFFICE.

JOHN RUMELY, OF LA PORTE, INDIANA.

IMPROVEMENT IN THRASHING-MACHINES.

Specification forming part of Letters Patent No. 214,056, dated April 8, 1879; application filed September 19, 1878.

*To all whom it may concern:*

Be it known that I, JOHN RUMELY, of La Porte, in the county of La Porte and State of Indiana, have invented certain new and useful Improvements in Thrashing-Machines; and I do hereby declare that the following is a full, clear, and exact description thereof, reference being made to the accompanying drawings, which form a part of this specification, in which—

Figure 1:
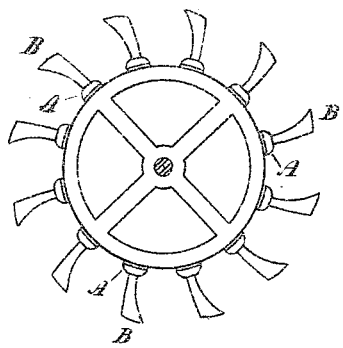
Figure 2:
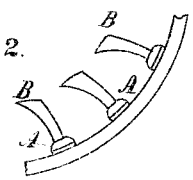
Figure 3:
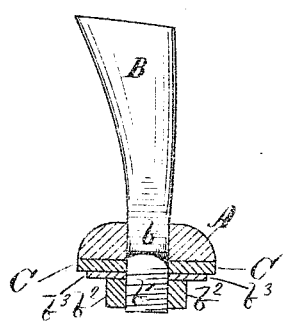
Figure 4:
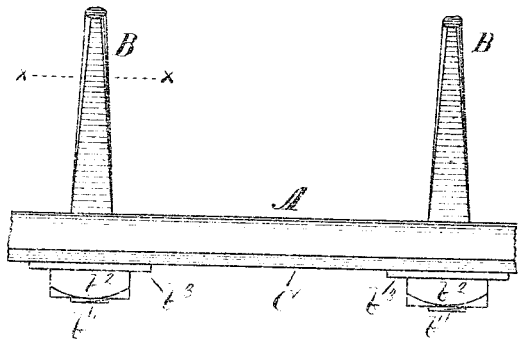
Figure 5:

Figure 1 is a side view of a cylinder for a thrashing-machine embodying my improvement. Fig. 2 is a similar view of the concave; Fig. 3, a sectional view of one of the longitudinal teeth-supporting ribs of the cylinder or concave, showing one of the teeth and its method of attachment. Fig. 4 is a side view of one of said ribs, showing two teeth. Fig. 5 is a sectional diagram to illustrate the purpose of making the teeth rounded at the sides.

Like letters of reference denote like parts wherever employed in the several figures.

In the said drawings, A A, &c., represent the longitudinal metal bars of the cylinder or concave. I usually employ twelve of these ribs upon a cylinder, and they are supported, as shown at Fig. 1, from a circular framework of suitable structure, such as is ordinarily employed in thrashing-machine cylinders of the present day. B B are the teeth, made with a shank, $b$, which fits into a square hole in the bar, and is provided with a round extension, $b^1$, cut with a thread, to receive a nut, $b^2$.

When all of the teeth for a single bar are inserted a wooden strip, made preferably of hard wood, as shown at C, is applied to the under or flat side of the bar, and, being perforated at suitable points for the extensions or shanks $b^1$ to pass through it, is pressed up against the bar. A washer, $b^3$, may then be applied, and the nuts $b^2$ screwed firmly down to set the teeth securely to the bar. This produces a very tight and lasting means for securing the teeth in place. The wooden strip yields just enough to cause a rigid lock to be effected, and the teeth cannot rattle loose thereafter.

The teeth are made of the ordinary form, broadening from their insertion to the outer extremity, and at the same time becoming thinner.

The chief difference between my improved teeth and former teeth consists in the fact that my improved teeth are made oval in cross-section—that is to say, the two sides of the tooth are rounded, as shown in cross-section at Fig. 5.

It will be understood that the strength and durability of the teeth are greatly enhanced by reason of the form given them. I do not now refer to the oval character of the cross-section, but to the fact of their being broadened and flattened from their insertion toward the outer extremity.

In making cylinders and concaves it is the intention to set the teeth perfectly true, so that as the teeth of the cylinder pass those of the concave the space between the opposing teeth shall always be true and equal from end to end without variation; but it is not always possible to do this perfectly by reason of the flattened shape of the tooth, which exaggerates any misplacement, and if done perfectly at first it may happen that a tooth may become bent or turned slightly.

The difficulty occasioned by bending is not easy to remedy, except by removal and renewal of the tooth. The rounding of sides of the tooth will, however, compensate for any accidental displacement by turning. Moreover, it will enable the cylinder to be constructed with greater ease, as such great pains or accuracy in setting the teeth will not be necessary.

This will be understood from the diagram at Fig. 5. It will be noticed in that figure that the left-hand tooth is straight with the paper, while the right-hand one is turned or rotated slightly to an incline. Still it will be observed that the space between the teeth has not either increased or diminished by reason of this rotation.

It may be remarked for the benefit of those not skilled in such matters that the reason it is necessary to have the space between the teeth always the same, and the teeth truly aligned, is because otherwise a wedging action of the straw between the teeth is liable to take place. The rounding of the flat teeth makes them self adjusted without special attention to this point.

I am aware that round pointed pegs have been used for teeth, and I do not claim such as my invention, because, although a cylindrical peg cannot, of course, get out of alignment by turning, still it is not a desirable form, not being so strong or effective as the flattened tooth.

I claim—

The improved tooth for thrashing-machine cylinders and concaves, the said tooth being widened and flattened from its insertion toward its outer extremity, and having the sides rounded, substantially as and for the purpose specified.

JOHN RUMELY.

Witnesses:
  H. HANSHEER,
  GEO. C. DORLAND.